United States Patent
Jones

(10) Patent No.: US 11,653,651 B2
(45) Date of Patent: May 23, 2023

(54) PLANT GROWTH REGULATOR COMPOSITIONS AND METHODS OF USING SAME

(71) Applicant: WINFIELD SOLUTIONS, LLC, Shoreview, MN (US)

(72) Inventor: Marcus Jones, Ankeny, IA (US)

(73) Assignee: Winfield Solutions, LLC, Arden Hills, MN (US)

( * ) Notice: Subject to any disclaimer, the term of this patent is extended or adjusted under 35 U.S.C. 154(b) by 497 days.

(21) Appl. No.: 16/527,691

(22) Filed: Jul. 31, 2019

(65) Prior Publication Data

US 2020/0037610 A1 Feb. 6, 2020

Related U.S. Application Data

(60) Provisional application No. 62/712,641, filed on Jul. 31, 2018.

(51) Int. Cl.
*A01N 43/38* (2006.01)
*A01N 43/90* (2006.01)
*A01N 43/12* (2006.01)

(52) U.S. Cl.
CPC ............. *A01N 43/38* (2013.01); *A01N 43/12* (2013.01); *A01N 43/90* (2013.01)

(58) Field of Classification Search
CPC ........ A01N 43/38; A01N 43/90; A01N 43/12; A01N 25/00; A01N 45/00; A01G 22/20; A01G 7/06
See application file for complete search history.

(56) References Cited

U.S. PATENT DOCUMENTS

| | | | |
|---|---|---|---|
| 5,188,655 A * | 2/1993 | Jones | A01N 43/90 504/136 |
| 10,104,883 B2 | 10/2018 | Stoller et al. | |
| 2005/0197253 A1* | 9/2005 | Stoller | A01N 43/90 504/138 |
| 2016/0198714 A1* | 7/2016 | Stoller | A01N 25/02 504/136 |
| 2016/0295868 A1 | 10/2016 | Jones et al. | |

OTHER PUBLICATIONS

Cato, S. C., Sinergism among auxins, gibberellins and cytokinins in tomato cv. Micro-Tom, 2013, Horticultura Brasileira, vol. 31, pp. 549-553. (Year: 2013).*
Winfield Solutions, LLC, "Ascend PRO—Plant Growth Regulator", Distributed by: Winfield Solutions, LLC Ascend® is a registered trademark of Winfield Solutions, LLC, Unknown, 10 pages.

* cited by examiner

*Primary Examiner* — Monica A Shin
(74) *Attorney, Agent, or Firm* — Padda Law Group

(57) ABSTRACT

Methods of improving plant growth involve applying a first growth composition to a plant or part thereof during a first growth stage. The first growth composition includes a first active component combination comprised of auxin, gibberellin and cytokinin. The amount of cytokinin is less than the amount of auxin and gibberellin. The method also involves adjusting the amount of auxin, the amount of gibberellin, and/or the amount of cytokinin after the first growth stage, and applying a second growth composition to the plant or part thereof during a second growth stage. The second growth composition can include a second active component combination, different than the first, that includes a second amount of auxin, a second amount of gibberellin, and a second amount of cytokinin. In some examples, the method can also involve growing the plant to maturity, thereby improving growth of the plant.

11 Claims, 3 Drawing Sheets

PLANT GROWTH REGULATOR COMPOSITIONS AND METHODS OF USING SAME

TECHNICAL FIELD

Implementations relate to plant growth regulator compositions and methods of applying such compositions to plants. Particular implementations involve applying specifically formulated compositions at specific timepoints during plant development.

BACKGROUND

Improving plant growth and development is a major focus of the agricultural industry. One approach to achieving robust growth involves applying growth stimulants to seeds and young plants. These substances may include plant growth regulators (PGRs), which typically comprise combinations of plant hormones that promote cellular growth processes like mitosis, and other substances including, for example, biostimulants, biologicals, and plant extracts. Utilization of PGRs has been suboptimal, however, because preexisting growth operations have typically involved applying the same PGR product, regardless of its composition, across multiple distinct stages of plant development. As a result, PGR formulations are often applied at inopportune times, resulting in wasted product, possibly undesired results, and untapped growth potential.

SUMMARY

Figure 1:
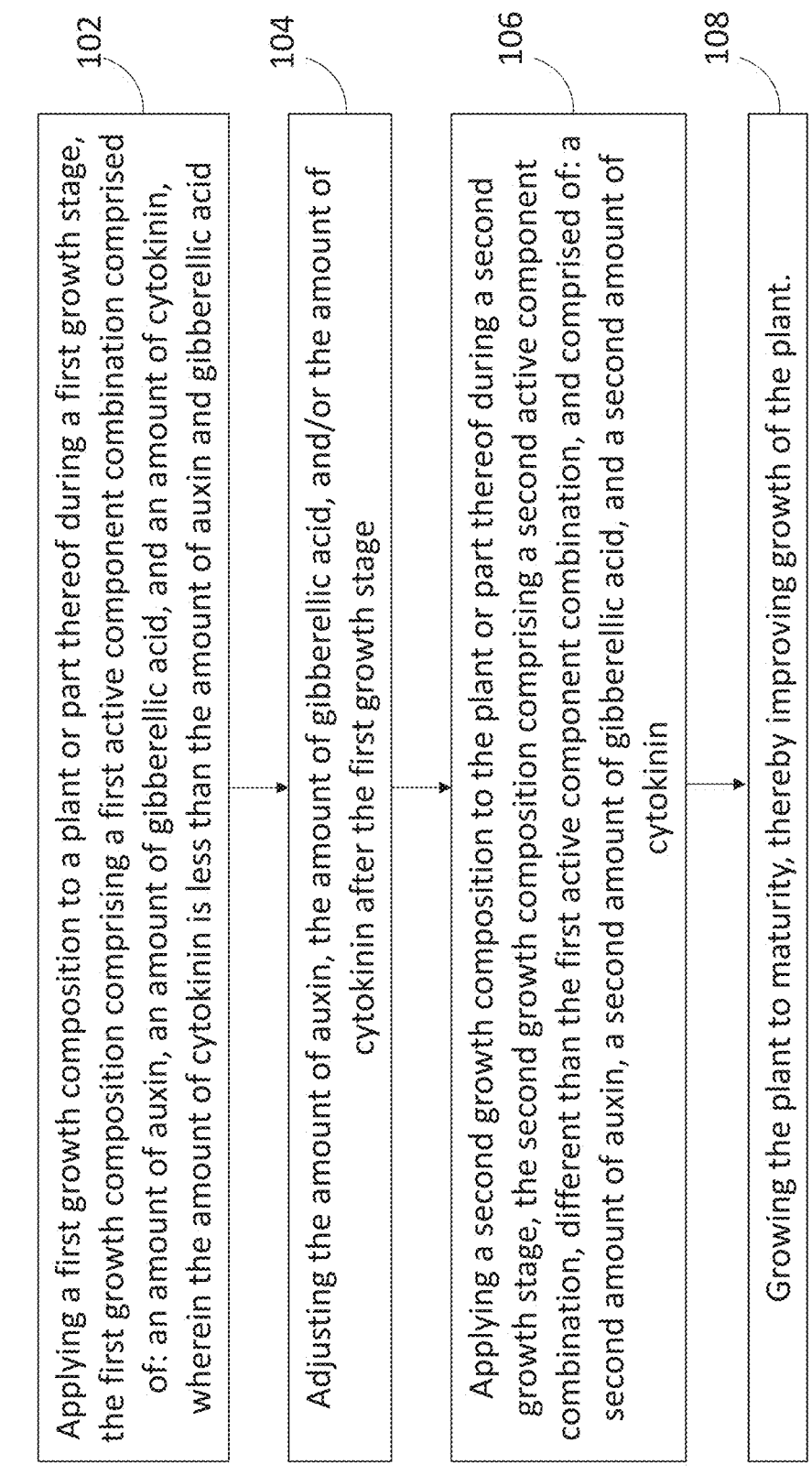
FIG. 1 is a flow diagram of a method performed in accordance with principles of the present disclosure.

Implementations provide PGR compositions formulated to cause improved plant growth. Specific embodiments include PGR compositions comprising a combination of active components that includes auxin, gibberellic acid and/or cytokinin. In some examples, the combination of active components includes moderate to high amounts of auxin and/or gibberellic acid, and low amounts of cytokinin. Embodiments also provide combinations of active components that include moderate to high amounts of cytokinin. The PGR compositions disclosed herein can be applied to growing plants, plant seeds and/or distinct plant parts during various stages of plant development. Specific embodiments involve seed-applied or in-furrow application of PGR compositions comprising little to no cytokinin at a first growth stage, e.g., the VE growth stage, to improve corn plant growth. Embodiments also involve foliar application of PGR compositions comprising moderate to high cytokinin levels at a second growth stage, e.g., the V4 growth stage, to improve corn plant growth. Adjustment of the PGR component ratios can be implemented one or more times between the first and second growth stages in some examples, and may also be performed at least once after the second growth stage. Also disclosed are methods of formulating PGR compositions by experimentally evaluating the growth effects elicited by different ratios of plant growth regulators.

In accordance with principles of the present disclosure, a method of improving plant growth may involve applying a first growth composition to a plant or part thereof during a first growth stage, the first growth composition comprising a first active component combination comprised of: an amount of auxin, an amount of gibberellic acid, and an amount of cytokinin, where the amount of cytokinin is less than the amount of auxin and gibberellic acid. The method can further involve adjusting the amount of auxin, the amount of gibberellic acid, and/or the amount of cytokinin after the first growth stage and applying a second growth composition to the plant or part thereof during a second growth stage. The second growth composition can include a second active component combination, different than the first active component combination, comprised of: a second amount of auxin, a second amount of gibberellic acid, and a second amount of cytokinin. In some examples, the method can also involve growing the plant to maturity, thereby improving growth of the plant.

In some embodiments, the amount of cytokinin in the first growth composition is about 0 to about 20 wt % by weight of the first active component combination. In some examples, the amount of auxin in the first growth composition is about 20 to about 67 wt % by weight of the first active component combination. In some implementations, the amount of gibberellic acid in the first growth composition is about 20 to about 67 wt % by weight of the first active component combination. In some examples, the plant or part thereof includes a seed, a stem, a leaf, roots, and/or combinations thereof. In some embodiments, applying the first growth composition involves seed-applied or in-furrow application thereof.

In some implementations, applying the second growth composition comprises foliar application thereof. In some examples, the second amount of cytokinin in the second growth composition is about 45 to about 65 wt % by weight of the second active component composition. In some embodiments, the second amount of auxin in the second growth composition is about 15 to about 45 wt % by weight of the second active component composition. In some implementations, the second amount of gibberellic acid in the second growth composition is about 10 to about 30 wt % by weight of the second active component composition. In some examples, the first growth stage includes the VE growth stage and the second growth stage includes the V4 growth stage. In some embodiments, the second growth stage spans the V1 and V4 growth stage.

In some examples, adjusting involves increasing the amount of cytokinin at a V1 growth stage relative to the amount of auxin and gibberellic acid. In some embodiments, adjusting involves increasing the amount of cytokinin two or more times before the plant reaches a V4 growth stage. In some implementations, the first and second growth compositions further include one or more adjuvants and excipients. In some examples, the plant is a corn plant. In some embodiments, improving growth of the plant comprises increasing plant size relative to a control plant that was not treated with the first or second growth composition.

In accordance with principles of the present disclosure, a method of improving plant growth involves applying a growth composition to a plant or part thereof. The growth composition can include an active component combination that includes an amount of auxin, gibberellin and cytokinin. The amount of cytokinin may be less than the amount of auxin and gibberellin. The method can involve growing the plant to maturity, thereby improving growth of the plant.

DETAILED DESCRIPTION

The PGR compositions provided herein can promote plant growth and development, and may be configured for seed-applied or in-furrow and/or foliar applications. Particular PGR compositions can include distinct amounts of active components including auxin, gibberellin (e.g., gibberellic acid) and/or cytokinin, and may be formulated specifically to stimulate the growth of corn plants at a first growth stage, such as the VE growth stage, in response to seed-applied or in-furrow application of the compositions. Additional compositions may be formulated specifically to stimulate corn plant growth at a second growth stage, such as the V4 growth stage, in response to foliar application of the compositions. The compositions have been optimized for promoting growth at particular developmental stages by experimentally assessing different ratios of PGR active components at various timepoints throughout plant development. Implementations of the PGR compositions configured for seed-applied or in-furrow application deviate from preexisting PGR compositions by including little to no cytokinin and greater amounts of auxin and gibberellic acid.

PGR Compositions

The compositions provided according to the present disclosure include various amounts of PGRs, which may include but are not limited to auxins such as indole butyric acid (IBA), gibberellins such as gibberellic acid, and/or cytokinins such as kinetin. The PGRs may be blended in various combinations, such that each PGR can be considered a PGR component, which can be further combined with additional components, such as one or more excipients and adjuvants. The PGR compositions are configured to stimulate specific plant growth processes. Accordingly, applying specific PGR compositions at specific timepoints may stimulate particular growth processes to a greater extent than can be achieved under natural growth conditions or upon applying preexisting PGR compositions. Example compositions include moderate to high amounts of auxins and/or gibberellins, and little to no cytokinin. Additional examples include moderate to high amounts of cytokinin.

Auxins are produced mainly in and around growing regions on plant shoots. Auxins typically move from the shoots and roots in the phloem, and more slowly by cell-to-cell polar transport. Example effects elicited by auxins include apical dominance, tropisms, shoot elongation and root initiation. Natural deficiencies of zinc and/or phosphorus may inhibit auxin production in plants. Cytokinins are produced primarily in root tips. Seeds, young stems and leaves also may contain high levels of cytokinins, which are transported through the xylem from the roots to the shoots of a plant. Cytokinins promote cell division in shoot tissue, delay leaf senescence, and promote nodule development. Flooding, drought and high temperatures can inhibit cytokinin production and transport. Gibberellins, e.g., gibberellic acid, are also produced in root tips, and can be found in seeds, young stems and leaves. Gibberellins move from roots to shoots in the xylem and from leaves to shoots by cell-to-cell transport, promoting plant germination and cell elongation. Gibberellin production in plant roots and gibberellin movement to plant shoots can be inhibited by flooding. Accordingly, each of the PGR components disclosed herein, i.e., cytokinins, auxins and gibberellins, drive specific physiological processes and are inhibited by specific environmental phenomena.

Each PGR composition disclosed herein can include an active component combination that includes an auxin, a gibberellin, and/or a cytokinin. As mentioned above, cytokinin may constitute the minority component of the active component combination in some examples configured for in-furrow application. By including the smallest proportion of cytokinin, such compositions may deviate sharply from preexisting compositions recommended for seed-based or in-furrow application, which typically include moderate to high amounts of cytokinin, such as greater than or approximately equal to 50 wt % of the total active component load. Specific examples of compositions provided herein can include cytokinin in amounts ranging from about 0 to about 50 wt %, about 0 to about 40 wt %, about 0 to about 30 wt %, about 0 to about 20 wt %, about 0 to about 10 wt %, about 10 to about 20 wt %, or about 20 to about 30 wt % based on the weight of the active component combination. The amount of auxin can also vary, ranging from about 10 to about 90 wt %, about 20 to about 80 wt %, about 20 to about 70 wt %, about 20 to about 60 wt %, about 20 to about 50 wt %, about 20 to about 40 wt %, about 20 to about 30 wt %, about 50 to about 90 wt %, about 60 to about 70 wt %, or about 67 wt % based on the weight of the active component combination. The amount of gibberellin can also vary, ranging from about 10 to about 90 wt %, about 20 to about 80 wt %, about 20 to about 70 wt %, about 20 to about 60 wt %, about 20 to about 50 wt %, about 20 to about 40 wt %, about 20 to about 30 wt %, about 50 to about 90 wt %, about 60 to about 70 wt %, or about 67 wt % based on the weight of the active component combination. Specific embodiments may include about 33 wt % auxin and about 67 wt % gibberellic acid based on the weight of the active component combination, or about 33 wt % gibberellic acid and about 67 wt % auxin based on the weight of the active component combination. An embodiment may include about 20 wt % cytokinin, about 60 wt % auxin, and about 20 wt % gibberellic acid. Embodiments may also include about 20 wt % cytokinin, about 60 wt % gibberellic acid, and about 20 wt % auxin. Examples may also include small levels of cytokinin, e.g., about 7 wt %, and similar levels of auxin and gibberellic acid, e.g., about 46 to about 47 wt %, based on the weight of the active component combination. The proportion of combined active components relative to the overall PGR composition may also vary, ranging from about 0.1 to about 0.2 wt %, about 0.14 to about 0.19 wt %, about 0.16 to about 0.18 wt %, about 0.17 to about 0.175 wt %, or about 0.171 wt % in various examples. While auxin, gibberellin, and cytokinin may be referenced herein, it should be understood that such components embody classes of PGR compounds, and that specific subtypes of each PGR component may be utilized in particular embodiments. For example, the auxin may comprise indole butyric acid (IBA), the gibberellin may comprise gibberellic acid ($GA_3$), and the cytokinin may comprise kinetin. The more general class of each compound is referenced herein for illustration purposes only, and should not be viewed as limiting.

As further described below, cytokinin-dominant PGR compositions may be configured specifically for foliar application during a second growth stage, e.g., V4. Examples of such compositions can include cytokinin in amounts ranging from about 35 to about 75 wt %, about 45 to about 65 wt %, about 54 to about 60 wt %, about 50 to about 60 wt %, about 58 to about 62 wt %, about 52 to about 58 wt %, or about 53 to about 55 wt % based on the weight of the active component combination. The amount of auxin can also vary, ranging from about 15 to about 45 wt %, about 15 to about 25 wt %, about 20 to about 27 wt %, about 18 to about 22 wt %, about 20 to about 40 wt %, about 23 to about 33 wt %, about 25 to about 30 wt %, or about 26 to about 28 wt % based on the weight of the active component combination. The amount of gibberellic acid may also vary, ranging from about 10 to about 30 wt %, about 15 to about 25 wt %, about 18 to about 22 wt %, about 16 to about 20 wt %, or about 18 to about 19 wt % based on the weight of the active component combination.

The PGR compositions can further include one or more adjuvants or surfactants, which can comprise agriculturally acceptable adjuvants formulated to improve the effect(s) on plant growth and/or development caused by a combination of active components. The amount of adjuvant included in a PGR composition may vary, ranging in some embodiments from about 85 to about 99.9 wt %, about 90 to about 99.8 wt %, about 95 to about 99.8 wt %, about 98 to about 99.8 wt %, about 99 to about 99.7 wt %, about 99.5 to about 99.8 wt %, or about 99.6 to about 99.7 wt % by weight of the PGR composition.

The PGR compositions can further include one or more excipients, which can comprise agriculturally acceptable excipients formulated as chemically inert diluents and/or carrier substances for the combination of active components.

Methods of Formulation

Methods of formulating the PGR compositions described herein can involve conducting one or more mixture experiments. In some examples, a mixture experiment can be designed to systematically evaluate the growth effects caused by various ratios of active components while maintaining the same total amount of the active components included in a given PGR composition. Maintaining identical active component loads advantageously isolates the growth effects caused by specific combinations of active substances, such that the growth response exhibited by the plants treated with the active substances can be attributed to the ratios of the individual PGR components instead of the total amount of the active component combination included in a PGR composition.

The methods of formulation and application described herein are not strictly limited to one particular plant type, and can be applied to various plant species, including but not limited to corn (maize), beans, soybeans, wheat, barley, alfalfa, and other crop species. Corn plants may include *Zea mays* hybrids, inbreds, haploids, subspecies and varieties. In some examples, one or more of the aforementioned plant types may be excluded from the methods disclosed herein.

Embodiments may involve seeding, germinating and growing test plants in the presence of various PGR compositions, each composition differing by the compositional makeup of the active component combination. Plant seeds, e.g., corn seeds or soybean seeds, can be planted in a growing medium, which may be deposited in a multicellular seedling tray. The planted seeds can be germinated in a controlled environment, which may be established in a greenhouse or growth chamber. The conditions of the controlled environment may vary depending on seed type or on a particular set of targeted conditions, such as drought, long daylight, short daylight, or heavy rain. In some examples, the controlled environment may comprise a temperature of about 25 to about 35° C., about 27 to about 33° C., about 29 to about 31° C., or about 30° C. The humidity may also vary, ranging from about 45 to about 61%, about 47 to about 59%, about 49 to about 57%, about 51 to about 55%, or about 53%. An initial period of constant light, e.g., 24 hours, may be applied to the planted seeds, which may be watered at consistent intervals, e.g., daily, to facilitate germination.

After germination, the seedlings may be removed at the soil level, and the freshly cut roots submersed in an aqueous solution containing a distinct PGR composition. Each PGR composition may differ only by the combination of active components included therein. For instance, each PGR composition may comprise a different amount of auxin, gibberellin, and/or cytokinin, but equal proportions of adjuvants and excipients. The submersed roots can be allowed to grow in each PGR composition for a defined period of time, which may vary. In some examples, the roots and nascent plants may be allowed to grow up to and/or through the V1, V2, V3, V4, V5 or V6 growth stage, at which point the plants can be measured for growth and developmental maturity. Improved plant growth and/or maturity can be determined by measuring any or all differences in growth and/or yield relative to untreated plants. Specific measurements acquired at earlier stages of growth, e.g., V1-V4, can include plant height, leaf size, leaf number, and/or one or more additional indicators of plant health, e.g., leaf color and/or turgidity. Indicators of corn plant growth and maturity acquired at later stages of growth can include, for example, seed output and/or ear prolificacy. The measurements acquired may thus depend on the growth stage targeted for improvement. With respect to corn plants, the growth stages can be defined as VE-V18. The VE stage lasts from the moment the coleoptile emerges through the soil surface to the moment just prior to the first leaf collaring. The VE stage can be defined by coleoptile emergence prior to first leaf collaring, the V1 stage by first leaf collaring, the V2 stage by first and second leaf collaring, the V3 stage by third leaf collaring, the V4 stage by fourth leaf collaring, the V5 stage by fifth leaf collaring, etc. The V4 stage spans the transition of the corn seedlings from heterotrophic to autotrophic growth. Heterotrophic growth is growth supported by each seed's storage energy reserves in the embryo, and autotrophic growth occurs when a seedling is capable of self-sustainable growth driven by nutrients extracted from the soil through the developing root system and the photosynthetic activity of the aerial tissue. The V4 stage is also the stage just prior to the development period in corn when the potential row number (ear girth) can be determined. Embodiments herein may involve applying a specific PGR composition to a plant seed and/or nascent plant part from the VE to about the V4 stage of development, at the VE stage only, at the V4 stage only, from the V4 stage to the V6 stage, or at any one or combination of stages.

Embodiments may also involve performing a root scan on the treated plants, for example using a WinRHIZO™ root scanner, to determine the effects on root density, architecture, surface area, length, diameter, area, volume, topology and/or color caused by a particular PGR composition. A root scan can involve removing the roots from the bottom of each plant stem. The roots from each plant can be scanned simultaneously according to some root scanning protocols.

The PGR composition driving the most improved relative growth at a particular growth stage under a particular set of environmental conditions can be identified. In some embodiments, one or more specific traits may be selected for analysis, irrespective of the overall growth of the plant, pursuant to efforts to further develop one or more plant characteristics. For example, the PGR composition driving the most significant improvements in corn ear prolificacy and/or kernel number may be selected for further analysis and/or use, regardless of plant height, root density, etc.

Methods of Use

Methods of improving plant growth can involve applying an aforementioned PGR composition to a plant seed, plant part, whole plant, and/or the soil or other growth medium, e.g., vermiculite and/or one or more commercial growth products, into which a seed is planted in an amount sufficient to increase plant growth, development and/or yield. The PGR composition utilized for a particular application may be formed by combining the desired ratio of active components with one or more adjuvants, excipients and/or other components disclosed herein in the amounts described above.

The total amount of active components added per quart of PGR composition may vary, ranging from about 0.05 to about 0.2 dry ounces, about 0.05 to about 0.1 dry ounces, about 0.05 to about 0.08 dry ounces, about 0.05 to about 0.06 dry ounces, about 0.055 to about 0.059 dry ounces, about 0.055 dry ounces, or about 0.059 dry ounces per quart of the total PGR composition. The amount of each individual active component may also vary depending on the mode of application. For seed or in-furrow application, the amount of cytokinin may range from about 0 to about 0.04 dry ounces, about 0.004 to about 0.02 dry ounces, about 0.008 to about 0.015 dry ounces, or about 0.010 to about 0.012 dry ounces per quart of the total PGR composition. The amount of auxin may range from about 0.01 to about 0.134 dry ounces, about 0.01 to about 0.05 dry ounces, about 0.011 to about 0.04 dry ounces, about 0.011 to about 0.037 dry ounces, about 0.0112 dry ounces, about 0.02 dry ounces, about 0.04 dry ounces, or about 0.035 dry ounces per quart of the total PGR composition. The amount of gibberellin, such as gibberellic acid, may range from about 0.01 to about 0.134 dry ounces, about 0.01 to about 0.05 dry ounces, about 0.011 to about 0.04 dry ounces, about 0.011 to about 0.037 dry ounces, about 0.0112 dry ounces, about 0.02 dry ounces, about 0.04 dry ounces, or about 0.035 dry ounces per quart of the total PGR composition. For foliar application, the amount of cytokinin may range from 0.02 to about 0.04 dry ounces, about 0.025 to about 0.035 dry ounces, about 0.028 to about 0.033 dry ounces, or about 0.03 to about 0.032 dry ounces per quart of the total PGR composition. The amount of auxin may range from about 0 to about 0.02 dry ounces, about 0.004 to about 0.016 dry ounces, about 0.008 to about 0.014 dry ounces, or about 0.010 to about 0.012 dry ounces per quart of the total PGR composition. The amount of gibberellin, e.g., gibberellic acid, may range from about 0.006 to about 0.026 dry ounces, about 0.01 to about 0.02 dry ounces, about 0.01 to about 0.012 dry ounces, about 0.014 to about 0.018 dry ounces, or about 0.015 to about 0.017 dry ounces per quart of the total PGR composition.

The PGR compositions can be utilized for seed-applied, in-furrow applications and/or foliar applications. For in-furrow applications, a PGR composition can be applied to the seed and/or growth medium, e.g., soil, into which the seed is planted. In some examples, a PGR composition comprising an active component combination that includes about 20 to about 67 wt % gibberellic acid, about 20 to about 67 wt % auxin, and about 0 to about 20 wt % cytokinin may be applied equally to each plant seed and/or within each furrow of soil and/or growth medium into which each plant seed, e.g., corn seed, is sown. Seed or in-furrow application of the PGR composition may be performed at one or more growth stages prior to germination, for example at the VE growth stage. For foliar applications, a PGR composition can be applied directly to the leaves, stem and/or flowers of each growing plant. In some examples a PGR composition comprising an active component combination that includes about 50 to about 60 wt % cytokinin, about 20 to about 30 wt % auxin, and about 15 to about 22 wt % gibberellic acid may be applied equally to each plant. In some examples, foliar application of the PGR composition may be employed for the V4 growth stage, only, while additional embodiments may continue foliar application of the PGR composition after the V4 growth stage, for example throughout the V5 and V6 growth stage. Both foliar and in-furrow applications can involve periodically spraying the treatment plants with a PGR composition. For example, foliar application may involve applying about 10 mL of PGR solution to each plant. The PGR composition can be applied at consistent intervals, e.g., daily, or every 2 days, every 7 days, every 14 days, every 21 days, or any interval therebetween. In some embodiments, plants or plant parts, e.g., roots, may be submerged within an aqueous solution of a PGR composition for a certain period of time.

The makeup of an enhanced or optimized PGR composition may differ by growth stage. As a result, examples may involve adjusting the formulation of the PGR composition applied to the seeds, nascent seedlings, roots, plants and/or plant parts at one or more developmental stages. For example, PGR compositions applied during the VE, V1, V2 and/or V3 growth stage(s) may comprise greater amounts of auxin and gibberellins than cytokinins. Some embodiments may exclude cytokinin entirely. After one or more of the aforementioned growth stages, e.g., after the V3 growth stage, a modified PGR composition, for example, containing equal proportions of cytokinin, auxin and/or gibberellin, or greater proportions of cytokinin relative to the auxin and/or gibberellin content, may be applied to the plants for one or more stages, such as during the V4 growth stage. Similarly, modified levels of cytokinin, auxin and/or gibberellin can be applied to one or more stages after the V4, V5 and/or V6 growth stage. Specific implementations may involve applying a first PGR composition during a first growth stage, e.g., VE, and applying a second PGR composition, different than the first, during a second growth stage, e.g., V4. Between the first and second growth stages, the PGR composition can be adjusted one or more times. For example, the PGR composition can be modified immediately after the VE growth stage, e.g., at V1, or immediately before the V4 growth stage, e.g., at V3, or when germination and/or growth of the plants necessitates a transition from in-furrow application to foliar application of the PGR composition. In addition or alternatively, the PGR composition can be modified gradually from the VE growth stage to the V4 growth stage, for example at each intervening growth stage or at regular intervals across the intervening growth stages. Specific embodiments can involve in-furrow application of an auxin- and/or gibberellin-dominant PGR composition during the VE growth stage, and foliar application of a cytokinin-dominant PGR composition during the V4 growth stage. By utilizing PGR compositions comprised of greater amounts of auxin and gibberellins than cytokinins at particular stages of growth, e.g., VE, the methods disclosed herein differ from preexisting methods that may apply PGR compositions containing greater levels of cytokinin across multiple stages of growth, which may include VE. Between the VE and V4 growth stages, the proportion of cytokinin included in the PGR composition relative to auxin and gibberellin can be increased one or more times, such that by the time the developing plant reaches the V4 growth stage, the PGR composition applied thereto comprises a higher ratio of cytokinin relative to auxin and gibberellin. In specific implementations, the proportion of cytokinin may be increased between the VE and V4 stages by about 30 to about 60%.

FIG. 1 is a flow diagram of a method of improving plant growth performed in accordance with principles of the present disclosure. The example method 100 shows the steps that may be implemented, in any sequence, to improve plant growth and/or development by applying a PGR composition specifically targeting enhanced growth at one or more growth stages. In additional examples, one or more of the steps shown in the method 100 may be supplemented or omitted. For instance, in some examples, the improved plant growth embodied at step 108 may be achieved prior to the plant reaching maturity.

In the embodiment shown, the method 100 begins at block 102 by "applying a first growth composition to a plant or part thereof during a first growth stage, the first growth composition comprising a first active component combination comprised of: an amount of auxin, an amount of gibberellic acid, and an amount of cytokinin, wherein the amount of cytokinin is less than the amount of auxin and gibberellic acid." The method 100 continues at block 104 by "adjusting the amount of auxin, the amount of gibberellic acid, and/or the amount of cytokinin after the first growth stage." In some examples, the method further involves the step shown at block 106, which involves "applying a second growth composition to the plant or part thereof during a second growth stage, the second growth composition comprising a second active component combination, different than the first active component combination, and comprised of: a second amount of auxin, a second amount of gibberellic acid, and a second amount of cytokinin." In this particular embodiment, the method 100 further involves, at step 108, "growing the plant to maturity, thereby improving growth of the plant."

Applying the PGR compositions according to the methods described herein may cause improvements in plant growth. For example, plants treated at the VE stage with a PGR composition containing high amounts of auxin and/or gibberellic acid relative to cytokinin may drive increases in plant height and/or leaf turgidity. Such improvements may be achieved early in plant development, for example at approximately the V4 growth stage, and may carry over throughout development as a positive consequence of improved early health. Plants treated at the VE stage with a PGR composition containing high amounts of auxin and/or gibberellic acid and no cytokinin may exhibit increases in total dry plant biomass relative to plants treated with a negative control lacking all three active components. Plants treated later during development, e.g., the V4 growth stage, with a cytokinin-dominant PGR composition may exhibit increases in dry plant biomass.

Examples

Field Trial 1

This field trial was conducted to evaluate the effects of single, two- and three-way PGR component mixtures on corn plant growth responsive to simulated in-furrow application. Each mixture comprised PGR components implicated in plant growth and stress physiology responses. The three active components evaluated in the trial included an auxin (IBA), a cytokinin (kinetin) and a gibberellin.

A biofungicide-mycorrhizae growing medium (Pro-Mix BX, sold by Premier Tech Horticulture) was mixed half-and-half with a medium-to-coarse vermiculite such that about 5 L of each medium was included in the mixture. To the mixture, about 1.6 L of distilled water was admixed. About 3.5 L of the mixture was then added to a 200-cell seed tray, distributed evenly across all cells. One corn seed (a hybrid, CROPLAN® 4099) was planted within each cell, and about 1.5 L of additional soil mixture spread over the seed tray. The seed tray was covered with a clear plastic cover and placed into a greenhouse programmed to maintain a controlled environment, which included a constant 30° C. temperature and a humidity level of about 53%. A 24-hour photoperiod of constant light was implemented. After two days, the cover was removed and the 600-800 ml of distilled water applied evenly to the tray. Watering was repeated every other day or intermittently as needed for the seeds to germinate.

After six days of growth, the nascent seedlings were cut off at about soil level. Using a ruler or marked cutting board, the hypocotyls were cut exactly 4 cm below the cotyledons using a scalpel blade, such that the epicotyls were about 2.5 and 3.5 cm in length. The freshly cut roots (at the VE growth stage) were placed in 20-ml glass scintillation vials containing 12 ml of 0.167% v/v of a treatment solution or a control solution and placed in a growth chamber. Table 1 shows the proportion of cytokinin, auxin and gibberellin included in each of Treatments 1-13, the proportion of each active component ranging from 0.0 to 1.0. Treatment 14 comprised a positive control treatment of Ascend SL (sold by Winfield® United), which includes an active component combination comprised of about 0.092 wt % cytokinin (kinetin), about 0.033 wt % gibberellin, and about 0.046 wt % auxin (indole butyric acid) based on the weight of the overall PGR composition. Treatment 15 comprised a negative control composition that included all components of Treatment 14 except the active components, i.e., no cytokinin, gibberellin or auxin.

TABLE 1

| Treatment | Cytokinin | Auxin | Gibberellin | Active Blend | Active Blend Sum |
|---|---|---|---|---|---|
| 1 | 1.00 | 0.00 | 0.00 | CYK only | 1.00 |
| 2 | 0.00 | 1.00 | 0.00 | AUX only | 1.00 |
| 3 | 0.00 | 0.00 | 1.00 | GIB only | 1.00 |
| 4 | 0.67 | 0.33 | 0.00 | CYK-AUX | 1.00 |
| 5 | 0.33 | 0.67 | 0.00 | CYK-AUX | 1.00 |
| 6 | 0.67 | 0.00 | 0.33 | CYK-GIB | 1.00 |
| 7 | 0.33 | 0.00 | 0.67 | CYK-GIB | 1.00 |
| 8 | 0.00 | 0.67 | 0.33 | AUX-GIB | 1.00 |
| 9 | 0.00 | 0.33 | 0.67 | AUX-GIB | 1.00 |
| 10 | 0.33 | 0.33 | 0.33 | Centroid | 1.00 |
| 11 | 0.60 | 0.20 | 0.20 | Three-way CYK dominant | 1.00 |
| 12 | 0.20 | 0.60 | 0.20 | Three-way AUX dominant | 1.00 |
| 13 | 0.20 | 0.20 | 0.60 | Three-way GIB dominant | 1.00 |
| 14 | 0.542 | 0.271 | 0.186 | Ascend ® SL | 1.00 |
| 15 | — | — | — | Untreated control | 0.00 |

Figure 2:
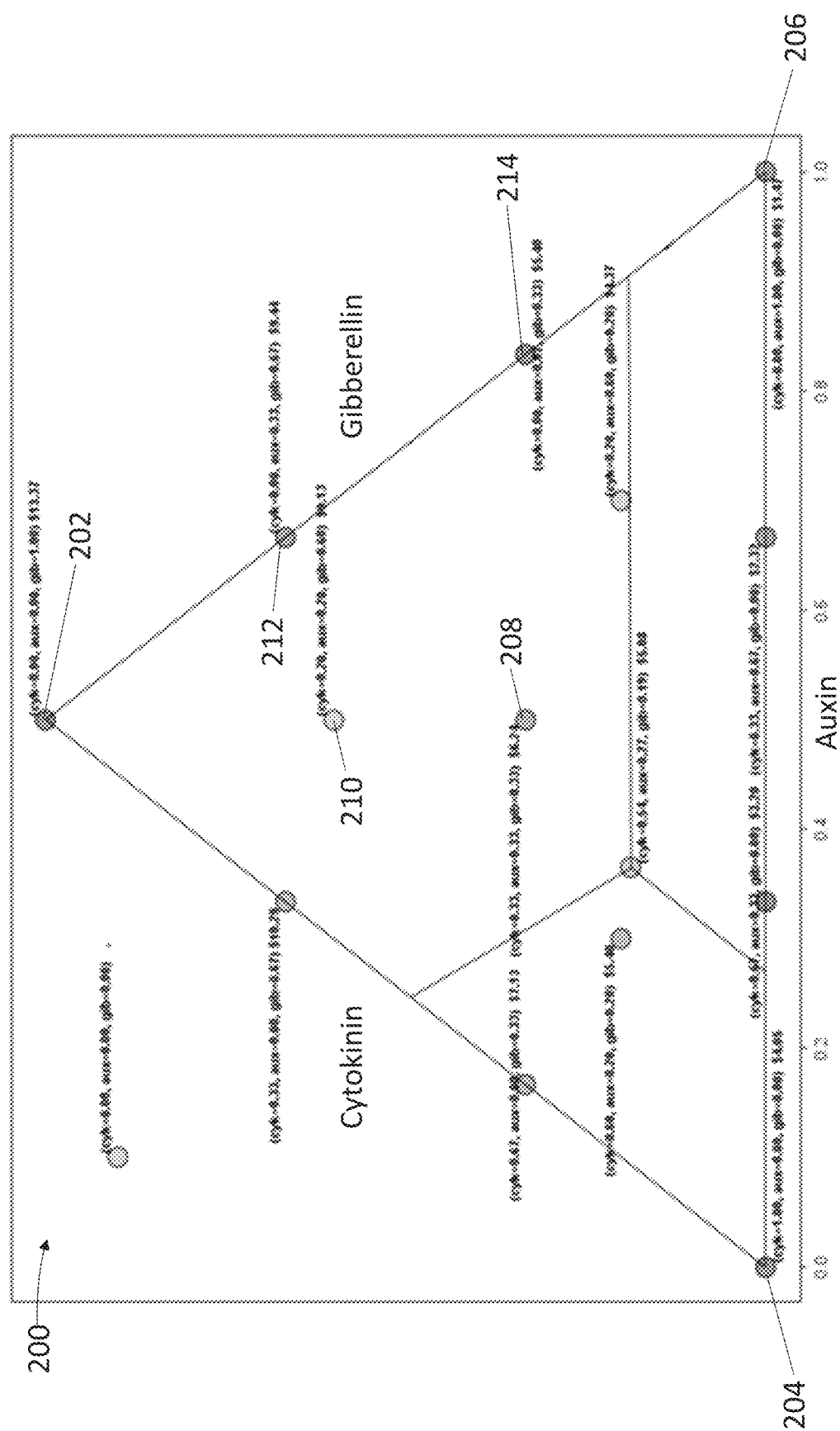
FIG. 2 is a triangle graph plotting a variety of PGR compositions based on the relative amounts of cytokinin, auxin and gibberellic acid included in each composition.

FIG. 2 a triangular graph 200 representing the variety of PGR active component ratios assigned to each treatment group listed in Table 1 according to the relative amounts of cytokinin, auxin, and gibberellin included in each composition. A single-component blend is represented at each apex and two-component mixtures containing equal parts of each component are represented at the mid-way point between each apex. For example, the upper-most point 202 represents a PGR composition comprised of an active component combination containing 100 wt % gibberellin, the lower left point 204 represents a PGR composition containing an active component combination containing 100 wt % cytokinin, and the lower right point 206 represents a PGR composition containing an active ingredient combination comprised of 100 wt % auxin. The points in the interior of the triangular graph represent three-component mixtures, and the centroid point 208 contains equal proportions of all three active components. By separately treating different plants with the different PGR compositions represented in FIG. 2, the effect of the active PGR components, both singly and in various combinations, was elucidated.

Figure 3C:
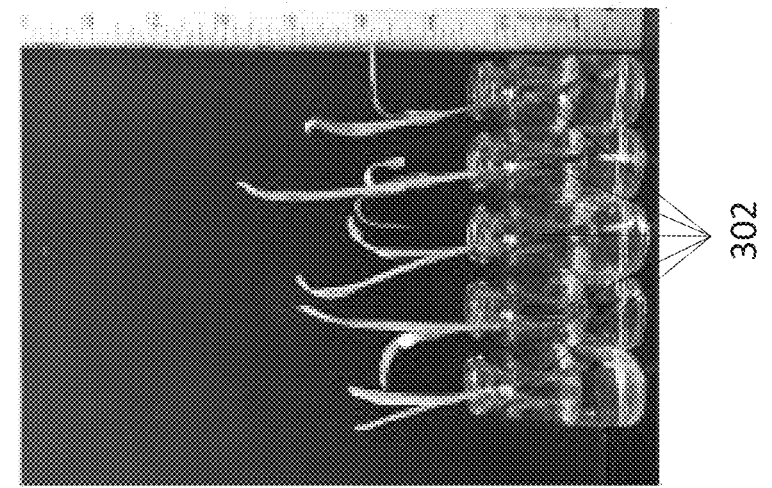
FIG. 3A, FIG. 3B and FIG. 3C each includes a plant photograph showing the growth of each plant elicited by applying a different PGR composition thereto.
Figure 3B:
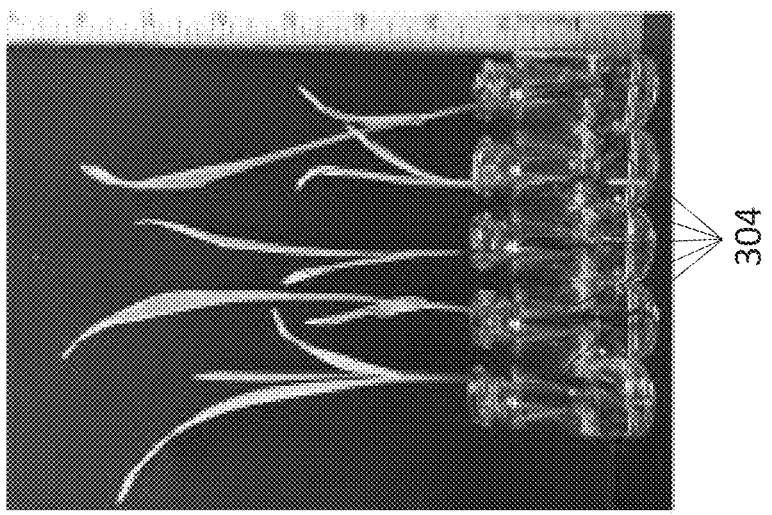
Figure 3A:
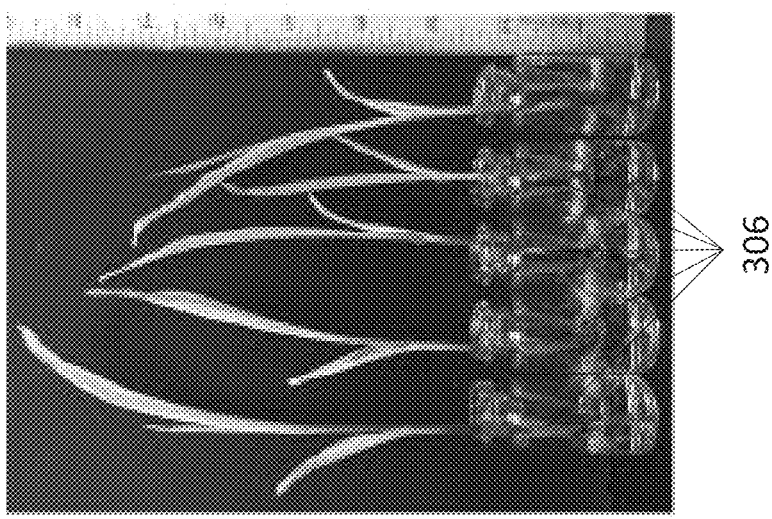

The growth chamber containing the PGR-submersed roots was maintained at a temperature of about 27° C. and a humidity of about 40%. Alternating periods of 14 hours of light and 10 hours of dark were applied to the growth chambers using 75% LED light, which included no red light. At the V1 growth stage, the plants were analyzed for improvements in growth. The photographs of FIGS. 3A-3C each show a plurality of seedling corn plants exhibiting representative growth for a composition dominant in one of the three PGR components evaluated in the trial. In particular, plants 302 treated with cytokinin-dominant mixtures of active components are shown in FIG. 3A, plants 304 treated with auxin-dominant mixtures are shown in FIG. 3B, and plants treated with gibberellin-dominant mixtures are shown in FIG. 3C. As is evident from the figures, plants 304 treated with auxin-dominant mixtures and plants 306 treated with gibberellin-dominant mixtures exhibited much stronger growth responses compared to plants 302 treated with cytokinin-dominant mixtures. Specifically, the plants 304 and 306 shown in FIGS. 3B and 3C grew substantially taller than the plants 302 shown in FIG. 3A, some of the plants growing at least twice as high relative to the plants shown in FIG. 3A. Plants 304 and 306 also developed leaves with greater turgidity than the plants 302 treated with a cytokinin-dominant PGR composition.

The plants 304, 306 shown in FIGS. 3B and 3C were subjected to treatment groups represented by plot points 210-218 included in FIG. 2. Composition 210 contained 20 wt % cytokinin, 20 wt % auxin, and 60 wt % gibberellin, composition 212 contained 0 wt % cytokinin, 33 wt % auxin, and 67 wt % gibberellin, and composition 214 contained 0 wt % cytokinin, 67 wt % auxin, and 33 wt % gibberellin. Accordingly, the active component content of the PGR compositions that drove the most substantial growth at the V1 growth stage included the auxin- and gibberellin-dominant compositions comprised of about 33 to about 67 wt % auxin and/or gibberellin, and only about 0 to about 20 wt % cytokinin.

The mass (mg) of the plants in each treatment group was measured to evaluate total dry biomass after a growing period, both in absolute terms and relative to the untreated control. The results are shown below in Table 2.

TABLE 2

| Treatment | Cytokinin | Auxin | Gibberellin | Mass (mg) | % Change vs. UTC |
|---|---|---|---|---|---|
| 1 | 1.00 | 0.00 | 0.00 | 518 | −28 |
| 2 | 0.00 | 1.00 | 0.00 | 845 | +17 |
| 3 | 0.00 | 0.00 | 1.00 | 869 | +20 |
| 4 | 0.67 | 0.33 | 0.00 | 530 | −27 |
| 5 | 0.33 | 0.67 | 0.00 | 620 | −14 |
| 6 | 0.67 | 0.00 | 0.33 | 575 | −20 |
| 7 | 0.33 | 0.00 | 0.67 | 622 | −14 |
| 8 | 0.00 | 0.67 | 0.33 | 854 | +18 |
| 9 | 0.00 | 0.33 | 0.67 | 833 | +15 |
| 10 | 0.33 | 0.33 | 0.33 | 649 | −10 |
| 11 | 0.60 | 0.20 | 0.20 | 587 | −19 |
| 12 | 0.20 | 0.60 | 0.20 | 635 | −12 |
| 13 | 0.20 | 0.20 | 0.60 | 589 | −18 |
| 14 | 0.542 | 0.271 | 0.186 | 622 | −14 |
| 15 | — | — | — | 722 | — |

As shown, every plant treated with cytokinin, even at amounts of only 20 wt % relative to the other active components, exhibited a smaller mass relative to the untreated control plant. Plants treated with cytokinin-dominant mixtures exhibited the smallest total mass, as plants subjected to cytokinin only and 67 wt % cytokinin each exhibited masses over 20% less than the mass of the untreated control. By contrast, plants treated with auxin and/or gibberellin, but no cytokinin, all exhibited increased masses relative to the untreated control. Accordingly, small amounts of cytokinin sufficed to inhibit growth of the test plants, even in the presence of much greater levels of auxin and gibberellin.

Field Trial 2

This field trial was conducted to evaluate the effects of the single, two- and three-way PGR component mixtures tested in trial 1 on corn plant growth responsive to foliar application.

Pots measuring 10 inches in diameter and 9.5 inches deep were filled with sandy loam top soil and sand at a ratio of 2:1, and three corn seeds placed in each pot. As in trial 1, there were 15 total treatments. Table 3 shows the proportion of cytokinin, auxin and gibberellin included in each of Treatments 1-13, the proportion of each active component ranging from 0.0 to 1.0. Treatment 14 comprised the positive control of Ascend SL, and Treatment 15 comprised the negative control that included all the components of Treatment 14 except the active PGR components. Table 3 also shows the application rate, timing and number for each treatment.

TABLE 3

| Treatment | Cytokinin | Auxin | Gibberellin | Active Blend | Application Timing | Application Number |
|---|---|---|---|---|---|---|
| 1 | 1.00 | 0.00 | 0.00 | CYK only | V4 | 2 |
| 2 | 0.00 | 1.00 | 0.00 | AUX only | V4 | 2 |

TABLE 3-continued

| Treatment | Cytokinin | Auxin | Gibberellin | Active Blend | Application Timing | Application Number |
|---|---|---|---|---|---|---|
| 3 | 0.00 | 0.00 | 1.00 | GIB only | V4 | 2 |
| 4 | 0.67 | 0.33 | 0.00 | CYK-AUX | V4 | 2 |
| 5 | 0.33 | 0.67 | 0.00 | CYK-AUX | V4 | 2 |
| 6 | 0.67 | 0.00 | 0.33 | CYK-GIB | V4 | 2 |
| 7 | 0.33 | 0.00 | 0.67 | CYK-GIB | V4 | 2 |
| 8 | 0.00 | 0.67 | 0.33 | AUX-GIB | V4 | 2 |
| 9 | 0.00 | 0.33 | 0.67 | AUX-GIB | V4 | 2 |
| 10 | 0.33 | 0.33 | 0.33 | Centroid | V4 | 2 |
| 11 | 0.60 | 0.20 | 0.20 | Three-way CYK dominant | V4 | 2 |
| 12 | 0.20 | 0.60 | 0.20 | Three-way AUX dominant | V4 | 2 |
| 13 | 0.20 | 0.20 | 0.60 | Three-way GIB dominant | V4 | 2 |
| 14 | 0.542 | 0.271 | 0.186 | Ascend ® SL | V4 | 2 |
| 15 | — | — | — | Untreated control | V4 | 2 |

All pots (4 replicates of each treatment=60 pots total) were placed in a large growth chamber. Nitrogen was applied at 0.5 lb. per 1000 square feet (28-8-18 with micronutrients) at planting and every 14 days thereafter, as shown in Table 4.

TABLE 4

Environmental parameters, fertilization, measurement and sampling schedule

| | Day | | | | | | |
|---|---|---|---|---|---|---|---|
| | −14 | 0 | 7 | 8 | 14 | 28 | 42 |
| | | | Temp (day/night) | | | | |
| | | Days 1-7: 73/60° F. | 65/50° F. | 58/40° F.[†] | Maintain 58/40° F. | | |
| | | | Soil moisture (VWC) | | | | |
| | Day 1-7: 100% to 50% | | Maintain 100% pot capacity[‡] | | | | |
| Fertilization[¶] | x | x | | | x | x | x |
| Treatment | | x[§] | | x[§] | | | |
| LI-COR | | x | | | x | x | x |
| Leaf sample | | x | | | x | x | x |

[†]Temperature gradually decreased to 58/40 F. (2 degree/hr)
[‡]Added water to 100% pot capacity every other day.
[¶]Complete fertilizer (28-8-18 with micronutrients).
[§]Data collection from LI-COR and leaf samples occurred 1 day following treatment application on day 0 and 14, respectively.

The corn seedlings were thinned to one plant per pot 18 days after planting. Preference adjuvant was added to each PGR composition at 0.25% (v/v), and each PGR solution applied to the foliage evenly at 10 mL per pot. After 42 days, dry plant biomass and plant height were measured to assess the growth effect caused by each PGR composition, the results shown below in Table 5.

TABLE 5

| Treatment | Active Blend | Biomass (g/pot) | Plant Height (cm) |
|---|---|---|---|
| 1 | CYK only | 3.11abc | 71.1abc |
| 2 | AUX only | 3.50abc | 75.1abc |
| 3 | GIB only | 2.68c | 67.2c |
| 4 | CYK-AUX | 2.88bc | 67.3c |
| 5 | CYK-AUX | 3.73abc | 77.9abc |
| 6 | CYK-GIB | 3.70abc | 78.9ab |
| 7 | CYK-GIB | 4.37ab | 80.2a |
| 8 | AUX-GIB | 2.75c | 68.5bc |
| 9 | AUX-GIB | 3.89abc | 75.0abc |
| 10 | Centroid | 3.69abc | 75.3abc |
| 11 | Three-way CYK dominant | 4.63a | 75.1abc |
| 12 | Three-way AUX dominant | 4.64a | 81.8a |
| 13 | Three-way GIB dominant | 3.47abc | 77.9abc |
| 14 | Ascend ® SL | 4.55a | 79.2ab |
| 15 | Untreated control | 2.34c | 72.2abc |

As shown in Table 5, plant biomass was significantly improved relative to the negative control by subjecting the plants to Treatments 11 and 14, which are both cytokinin-dominant PGR compositions. Specifically, Treatment 11 contains 60 wt % cytokinin, and 20 wt % of each auxin and gibberellin, and Treatment 14 contains 54.2 wt % cytokinin, 27.1 wt % auxin, and 18.6 wt % gibberellin. Treatment 11 caused a nearly 98% increase in biomass, and Treatment 14 caused about a 94% increase in biomass. Accordingly, plants subjected to cytokinin-dominant PGR compositions containing cytokinin, auxin and gibberellin at the V4 growth stage may exhibit a significant increase in plant biomass, especially after about 42 days.

As used herein, the term "about" modifying, for example, the quantity of a component in a composition, concentration, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or components used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities.

Similarly, it should be appreciated that in the foregoing description of example embodiments, various features are sometimes grouped together in a single embodiment for the purpose of streamlining the disclosure and aiding in the understanding of one or more of the various aspects. These methods of disclosure, however, are not to be interpreted as reflecting an intention that the claims require more features than are expressly recited in each claim. Rather, as the following claims reflect, inventive aspects lie in less than all features of a single foregoing disclosed embodiment, and each embodiment described herein may contain more than one inventive feature.

Although the present disclosure provides references to preferred embodiments, persons skilled in the art will recognize that changes may be made in form and detail without departing from the spirit and scope of the invention.

What is claimed is:

1. A method of improving plant growth, the method comprising:
    applying a first growth composition to a plant or part thereof during a first growth stage, the first growth composition comprising a first active component combination comprised of: about 20 to about 67 wt % auxin, about 20 to about 67 wt % gibberellic acid, and about 0 to about 20 wt % cytokinin;
    applying a second growth composition to the plant or part thereof during a second growth stage, the second growth composition comprising a second active component combination, comprised of: about 20 to about 30 wt % auxin, about 15 to about 22 wt % gibberellic acid, and about 50 to about 60 wt % cytokinin; and
    growing the plant to maturity, thereby improving growth of the plant.

2. The method of claim 1, wherein the plant or part thereof comprises a seed, a stem, a leaf, roots, and/or combinations thereof.

3. The method of claim 1, wherein applying the first growth composition comprises in-furrow application of the first growth composition.

4. The method of claim 1, wherein applying the second growth composition comprises foliar application of the second growth composition.

5. The method of claim 1, wherein the first growth stage comprises a VE growth stage.

6. The method of claim 1, wherein the second growth stage comprises a V4 growth stage.

7. The method of claim 1, wherein the second growth stage spans a V1 and V4 growth stage.

8. The method of claim 1, wherein the first and second growth compositions further comprise one or more adjuvants and excipients.

9. The method of claim 1, wherein the plant comprises a corn plant.

10. The method of claim 1, wherein improving growth of the plant comprises increasing plant size relative to a control plant that was not treated with the first or second growth composition.

11. The method of claim 1 wherein the first composition comprises about 0 to about 10 wt % cytokinin.

* * * * *